US012645844B2

(12) United States Patent
Park et al.

(10) Patent No.: US 12,645,844 B2
(45) Date of Patent: Jun. 2, 2026

(54) STORAGE DEVICE AND SYSTEM

(71) Applicant: SAMSUNG ELECTRONICS CO., LTD., Suwon-si (KR)

(72) Inventors: Soojung Park, Suwon-si (KR); Yeonwoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/584,489

(22) Filed: Feb. 22, 2024

(65) Prior Publication Data

US 2025/0094647 A1     Mar. 20, 2025

(30) Foreign Application Priority Data

Sep. 20, 2023     (KR) ........................ 10-2023-0125793

(51) Int. Cl.
*G06F 21/79*          (2013.01)
*G06F 21/31*          (2013.01)
*G06F 21/60*          (2013.01)

(52) U.S. Cl.
CPC .............. *G06F 21/79* (2013.01); *G06F 21/31* (2013.01); *G06F 21/604* (2013.01)

(58) Field of Classification Search
CPC ......... G06F 21/79; G06F 21/31; G06F 21/604
See application file for complete search history.

(56) References Cited

U.S. PATENT DOCUMENTS

| | | | |
|---|---|---|---|
| 7,386,546 B1 | 6/2008 | Santry et al. | |
| 8,732,466 B2 * | 5/2014 | Nagai ................... | H04L 9/0897 |
| | | | 713/168 |
| 10,089,134 B2 | 10/2018 | Geml et al. | |
| 10,769,116 B2 | 9/2020 | Giampaolo | |
| 11,604,599 B2 | 3/2023 | Valtonen | |
| 2005/0185067 A1 * | 8/2005 | Estakhri .............. | G06F 12/1408 |
| | | | 386/E5.067 |
| 2017/0357663 A1 | 12/2017 | Giampaolo | |
| 2018/0004559 A1 | 1/2018 | Geml et al. | |
| 2018/0191721 A1 | 7/2018 | Freyensee et al. | |
| 2019/0123839 A1 * | 4/2019 | Tamane .................. | H04W 4/40 |
| 2020/0117826 A1 * | 4/2020 | Lilly, Jr. ........... | G06F 16/24539 |
| 2020/0133809 A1 * | 4/2020 | Han ....................... | G06F 3/0689 |
| 2020/0334171 A1 * | 10/2020 | Meier ................. | G06F 21/6218 |
| 2021/0141910 A1 * | 5/2021 | Numata ................ | G06F 21/604 |
| 2021/0318828 A1 | 10/2021 | Valtonen | |
| 2022/0027051 A1 * | 1/2022 | Kant ..................... | G06F 3/0617 |
| 2022/0103352 A1 * | 3/2022 | Shin ..................... | H04L 9/0894 |
| 2023/0071555 A1 * | 3/2023 | Ogawa .................. | G06F 21/79 |
| 2023/0140209 A1 | 5/2023 | Suryanarayana et al. | |

(Continued)

FOREIGN PATENT DOCUMENTS

| | | | | | |
|---|---|---|---|---|---|
| CN | | 116204111 A | * | 6/2023 | ........... G06F 3/0622 |

*Primary Examiner* — Darshan I Dhruv

(74) *Attorney, Agent, or Firm* — Sughrue Mion, PLLC

(57)                    ABSTRACT

A storage device includes a non-volatile memory including a plurality of namespaces, and a storage controller configured to receive, from an external host, a first namespace identifier of a first namespace from among the plurality of namespaces and a first command requesting to control exposure of the first namespace, and based on the first namespace identifier and the first command, set the first namespace as a hidden namespace, and prevent the first namespace from being exposed to at least one user from among a plurality of users.

20 Claims, 15 Drawing Sheets

(56) References Cited

U.S. PATENT DOCUMENTS

| | | | |
|---|---|---|---|
| 2023/0185476 A1 | 6/2023 | Bert et al. | |
| 2023/0297251 A1* | 9/2023 | Numata ................ | G06F 3/0673 |
| | | | 711/163 |
| 2023/0305750 A1* | 9/2023 | Sasaki ................... | G06F 3/0664 |
| 2023/0315338 A1* | 10/2023 | Moghe ................. | G06F 3/0661 |
| | | | 709/238 |
| 2023/0342080 A1* | 10/2023 | Han ...................... | G06F 3/0619 |

* cited by examiner

STORAGE DEVICE AND SYSTEM

CROSS-REFERENCE TO RELATED APPLICATIONS

This application claims benefit of priority under 35 U.S.C. § 119 to Korean Patent Application No. 10-2023-0125793, filed on Sep. 20, 2023, in the Korean Intellectual Property Office, the disclosure of which is incorporated by reference herein in its entirety.

BACKGROUND

1. Field

The present disclosure relates generally to a storage device and system, and more particularly, to a storage device and system providing access based on namespaces.

2. Description of Related Art

A storage device may refer to a device that may store data under the control of a host and/or may include a device that may store data in a semiconductor memory, such as, but not limited to, a non-volatile memory (e.g., a solid-state drive (SSD)).

The storage device may be used in electronic devices such as, but not limited to, computers, smart phones, smart pads, and the like. Recently, as electronic devices may be used by increasing number of users, the need for security of data stored on storage devices may be increasing.

SUMMARY

One or more example embodiments of the present disclosure provide a storage device and system having improved security, when compared to related storage devices and systems.

Further, one or more example embodiments of the present disclosure provide a storage device and system having different exposure areas of the namespace depending on the user when a storage device is used by a plurality of users.

According to an aspect of the present disclosure, a storage device includes a non-volatile memory including a plurality of namespaces and a storage controller configured to receive, from an external host, a first namespace identifier of a first namespace from among the plurality of namespaces and a first command requesting to control exposure of the first namespace, and based on the first namespace identifier and the first command, set the first namespace as a hidden namespace, and prevent the first namespace from being exposed to at least one user from among a plurality of users.

According to an aspect of the present disclosure, a storage system includes a host and a storage device configured to receive, from the host, a first command instructing to limit exposure of a first namespace from among a plurality of namespaces included in a non-volatile memory of the storage device and expose the first namespace during a predetermined time period, and set, based on the first command, the first namespace as a hidden namespace.

According to an aspect of the present disclosure, a storage device includes a plurality of non-volatile memories including a plurality of namespaces and a storage controller configured to, based on receiving, from a host, a command instructing to output a namespace list of the host, authenticate the host by performing an authentication operation, and output, based on a result of the performing of the authentication operation, a first namespace list indicating first namespaces from among the plurality of namespaces that are allocated to the host and that excludes at least one second namespace from among the plurality of namespaces that is set as a hidden namespace for the host.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 2 is a drawing showing a storage device, according to an embodiment;

FIG. 3 is a schematic block diagram illustrating an example of the non-volatile memory of FIG. 2, according to an embodiment;

FIGS. 4 to 6 are drawings depicting a namespace allocated in an non-volatile memory, according to an embodiment;

FIG. 14 is a drawing illustrating a namespace list depending on the user, according to an embodiment.

DETAILED DESCRIPTION

Figure 1:
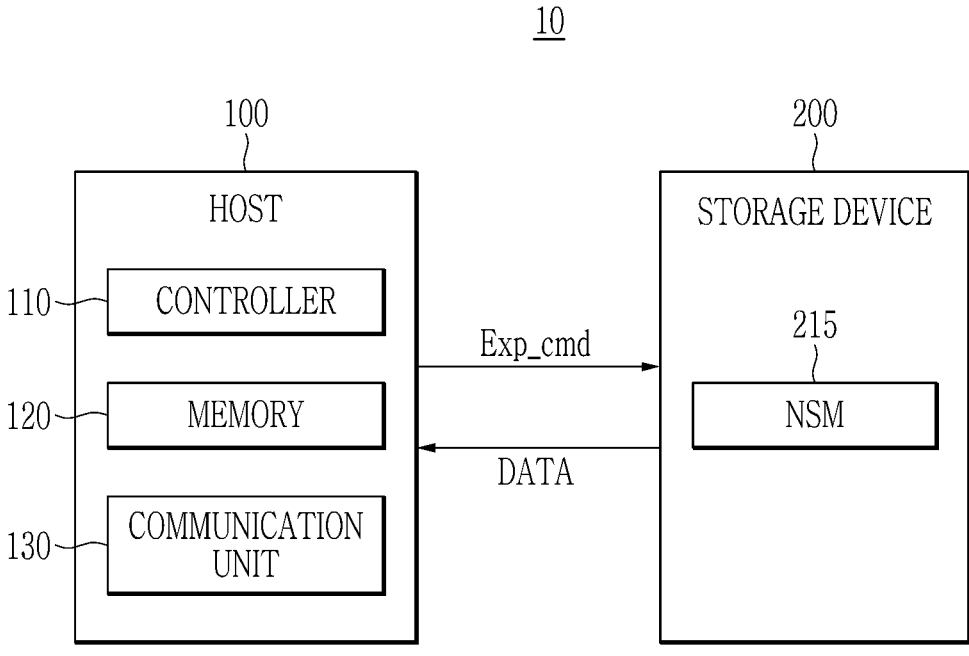
FIG. 1 is a drawing showing a storage system, according to an embodiment.

The present disclosure may be described hereinafter with reference to the accompanying drawings, in which embodiments of the disclosure are shown. As those skilled in the art may recognize, the described embodiments may be modified in various different ways, without departing from the spirit and/or scope of the present disclosure.

With regard to the drawings, parts that may not be needed to provide an understanding of the description may be omitted from the drawings for the sake of clarity. In addition, similar numerals may refer to like and/or similar constituent elements throughout the disclosure. The sequence of operations or steps is not limited to the order presented in the claims or figures, which means that the order of operations or steps may be changed, several operations or steps may be merged, a certain operation or step may be divided, and a specific operation or step may not be performed.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

In addition, a singular form may be intended to include a plural form as well, unless an explicit expression such as "one" or "single" is used. Terms including ordinal numbers such as first, second, and the like may be used only to describe various constituent elements, and are not to be interpreted as limiting these constituent elements. These terms may be used for a purpose of distinguishing one constituent element from other constituent elements. Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

Hereinafter, various embodiments of the present disclosure are described with reference to the accompanying drawings.

FIG. 1 is a drawing showing a storage system, according to an embodiment.

In one embodiment, a storage system 10 may be and/or may be included in user and/or electronic devices (e.g., a personal computer (PC), a laptop computer, a server, a media player, a digital camera, and the like), an automotive device (e.g., a navigation system, a black box, an automotive electronic device, and the like). Alternatively or additionally, the storage system 10 may be and/or may be included in a mobile system such as, but not limited to, a portable communication terminal (e.g., a mobile phone), a smart phone, a tablet PC, a wearable device, a healthcare device, an Internet of Things (IoT) device, and the like.

Referring to FIG. 1, the storage system 10 may include a host 100 and a storage device 200.

The host 100 may control an overall operation of the storage system 10.

The host 100 may communicate with the storage device 200 through various interfaces. For example, the host 100 may communicate with the storage device 200 through various interfaces such as, but not limited to, universal serial bus (USB), MultiMediaCard (MMC), peripheral component interconnect (PCI) express (PCI-e), advanced technology (AT) attachment (ATA), serial AT attachment (SATA), parallel AT attachment (PATA), small computer system interface (SCSI), serial attached SCSI (SAS), enhanced small device interface (ESDI), integrated drive electronics (IDE), non-volatile memory express (NVMe), and the like.

The host 100 may include a controller 110, a memory 120, and a communication unit 130.

In one embodiment, the controller 110 may control an operation of the host 100. For example, the controller 110 may manage an operation of storing the data (e.g., write data) of a buffer area of the memory 120 in a non-volatile memory 220, and/or storing the data (e.g., read data) of the non-volatile memory 220 in the buffer area.

In one embodiment, the controller 110 may transmit an exposure control command Exp_cmd to the storage device 200 through the communication unit 130. The exposure control command Exp_cmd may be configured to control exposure of a particular namespace from among a plurality of namespaces of the storage device 200. For example, the controlling of the exposure of the particular namespace may refer to controlling the particular namespace to be exposed only to a first user from among a plurality of users using the storage system 10. As another example, the controlling of the exposure of the particular namespace may refer to controlling the particular namespace not to be exposed to other users excluding the first user from among the plurality of users using the storage system 10.

The storage device 200 may include a namespace administrator (NSM) 215. The NSM 215 of the storage device 200 may expose the particular namespace only to the first user among the plurality of users, and/or not expose the particular namespace to other users excluding the first user from among the plurality of users, by performing an authentication operation with respect to the host 100. Hereinafter, among the plurality of namespaces, a namespace whose access and exposure to other users is limited may be referred to as a hidden namespace. In one embodiment, the host 100 may cancel and/or change a hidden namespace setting with respect to the particular namespace by using the exposure control command Exp_cmd.

In one embodiment, the exposure control command Exp_cmd may further include timing information and authorization information for assigning limited authorization with respect to the hidden namespace to other users. For example, when the storage system 10 enters a first mode corresponding to the timing information, the first user may assign limited authorization with respect to the hidden namespace to other users. That is, when the storage system 10 enters the first mode corresponding to the timing information, the host 100 may access the hidden namespace with the limited authorization. For example, the first mode may be and/or may include a recovery mode of the storage system 10, and the limited authorization may be and/or may include a read-only authorization. However, the present disclosure is not limited thereto, and the first mode may refer to other modes of the storage system 10 and/or the limited authorization may refer to other types of authorization.

The NSM 215 of the storage device 200 may expose the namespace set as the hidden name space at a timing corresponding to the timing information based on the exposure control command Exp_cmd. The NSM 215 of the storage device 200 is described with reference to FIG. 2.

The memory 120 may store instructions and/or data to be executed and/or processed by the controller 110. In one embodiment, the controller 110 and the memory 120 may be implemented as separate semiconductor chips. Alternatively, in one embodiment, the controller 110 and the memory 120 may be integrated on the same semiconductor chip. For example, the controller 110 may be one module from among a plurality of modules provided in an application processor (AP), and the application processor may be implemented as a system-on-a-chip (SoC).

The communication unit 130 may communicate with the storage device 200. For example, the communication unit 130 may receive data DATA from the storage device 200. Alternatively or additionally, the communication unit 130 may receive the exposure control command Exp_cmd generated by the controller 110, and/or may transmit the exposure control command Exp_cmd to the storage device 200.

The storage device 200 may include storage media for storing data according to a request from the host 100. The configuration and operation of the storage device 200 is described with reference to FIG. 2.

Figure 2:
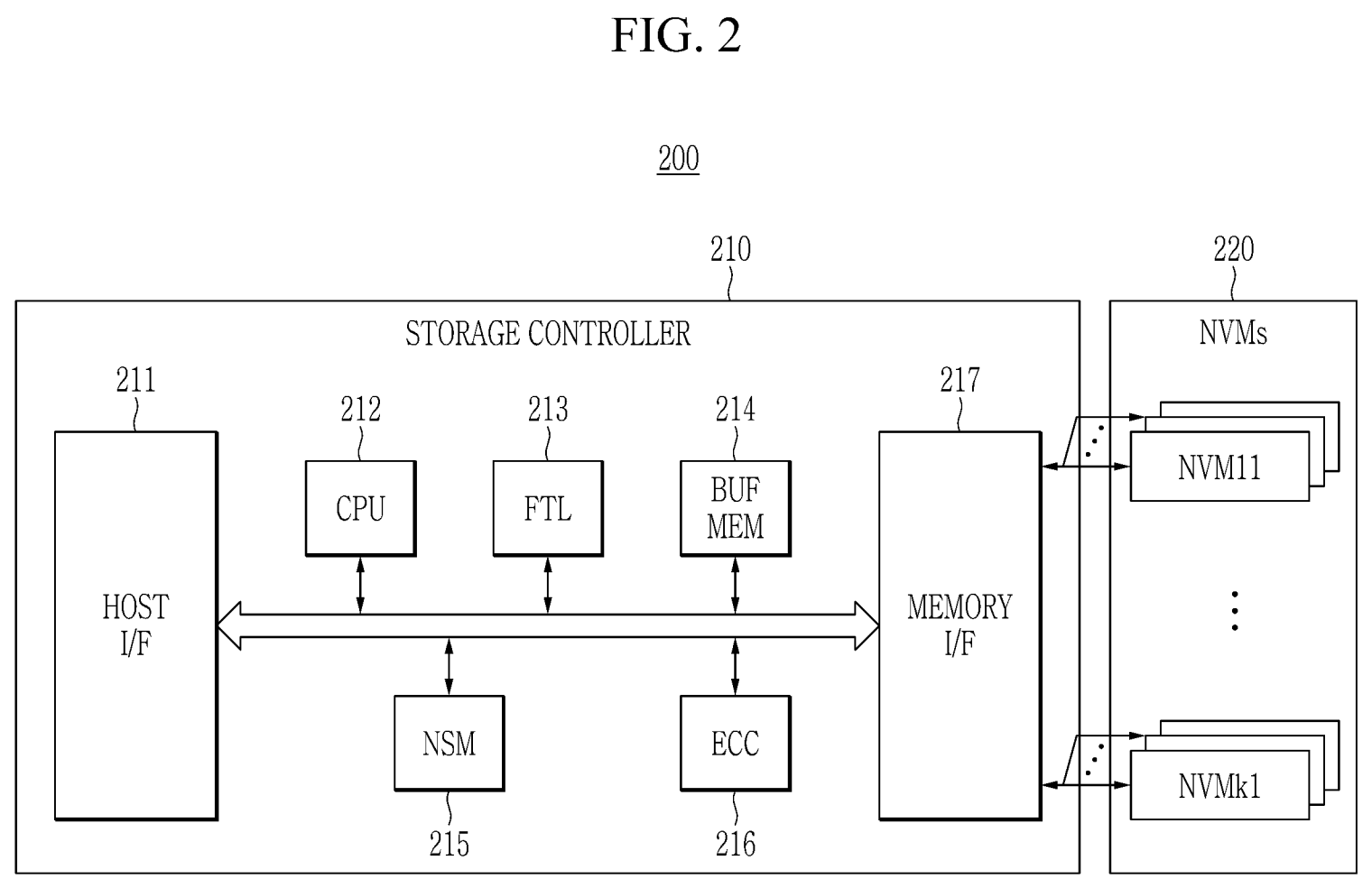

FIG. 2 is a drawing showing a storage device, according to an embodiment.

In one embodiment, the storage device 200 may be implemented in the form of a solid-state drive (SSD) and/or a memory card. However, the present disclosure is not limited in this regard, and the storage device 200 may be implemented in other forms.

In one embodiment, when the storage device 200 is and/or includes a client SSD, the first user may be an administrator (e.g., an original equipment manufacturer (OEM) user), and a second user may refer to an end user. However, the present disclosure is not limited thereto. Hereinafter, the description may be made assuming that the first user who sets the hidden namespace is an administrator, and other users (e.g., the second user) with limited access to the hidden namespace are an end user.

As shown in FIG. 2, the storage device 200 may include a storage controller 210 and the non-volatile memory 220. The storage device 200 may store and/or process data and/or commands transmitted from the host 100.

The storage controller 210 may include a host interface (I/F) 211, a central processing unit (CPU) 212, a flash transition layer (FTL) component 213, a buffer memory 214, the NSM 215, an error correction code (ECC) component 216, a memory interface (I/F) 217.

The number and arrangement of components of the storage controller 210 shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Alternatively or additionally, a set of (one or more) components shown in FIG. 2 may be integrated with each other, and/or may be implemented as an integrated circuit, as software, and/or a combination of circuits and software.

The host I/F 211 may transmit and/or receive packets to and/or from the host 100. A packet transmitted from the host 100 to the host I/F 211 may include commands and/or data to be written to the non-volatile memory 220, and the like. Packets transmitted from the host I/F 211 to the host 100 may include a response to the command and/or data read from the non-volatile memory 220, and the like.

The host I/F 211 may receive the exposure control command Exp_cmd from the host 100. The host I/F 211 may further receive a mode entry signal notifying that a particular mode has been entered, and/or a mode ending signal notifying that the particular mode has ended from the host 100. The mode entry signal and the mode ending signal are described with reference to FIGS. 11 to 13.

The CPU 212 may control an overall operation of the storage controller 210. For example, the CPU 212 may control the storage controller 210 by running firmware that may be loaded on the FTL component 213.

The FTL component 213 may perform various functions such as, but not limited to, address mapping, garbage collection, and the like. The FTL component 213 may change the logical address received from the host 100 to a physical address used to physically store data in the non-volatile memory 220, through the address mapping. Through the garbage collection function, the FTL component 213 may secure usable capacity in the non-volatile memory 220 by copying valid data of a block in the non-volatile memory 220 to a new block and erasing the existing (previous) block.

The buffer memory 214 may store instructions and/or data to be executed and/or processed by the storage controller 210. The buffer memory 214 may temporarily store data previously stored and/or to be stored in the non-volatile memory 220.

The NSM 215 may set the particular namespace as the hidden namespace from among the plurality of namespaces within the non-volatile memory 220 based on the exposure control command Exp_cmd received from the host 100. The hidden namespace may be an area where exposure to and/or access by other users excluding the first user from among the plurality of users of the storage device 200 may be limited and/or prevented.

The NSM 215 may allow access to the second user only in the particular mode of the storage system 10 and/or the storage device 200 based on the exposure control command Exp_cmd received from the host 100. The NSM 215 may further receive the mode entry signal notifying that the particular mode has been entered and the mode ending signal notifying that the particular mode has been ended from the host 100. The namespace is described with reference to FIGS. 4 to 6.

In one embodiment, the NSM 215 may include an exposure controller configured to control exposure of the namespace, an authentication module configured to authenticate the first user, and/or an authorization controller configured to control authorization change of the hidden namespace upon entering the particular mode. The NSM 215 is further described with reference to FIGS. 7 and 11.

The ECC component 216 may perform error detection and correction function on the read the data read from the non-volatile memory 220. For example, the ECC component 216 may generate parity bits with respect to the write data to be written to the non-volatile memory 220, and the generated parity bits may be stored in the non-volatile memory 220 together with the write data. When reading data from the non-volatile memory 220, the ECC component 216 may correct an error of the read data by using the parity bits read from the non-volatile memory 220 together with the read data, and output the error-corrected read data.

The memory I/F 217 may provide signal transmission and reception with the non-volatile memory 220. For example, the memory I/F 217 may send commands and/or control signals together with the data to be written to the non-volatile memory 220, and/or may receive the data read from the non-volatile memory 220. The memory I/F 217 may be implemented to comply with one or more standard communication protocols, such as, but not limited to, Toggle, Open NAND Flash Interface (ONFI), and the like.

The storage device 200 may be and/or may include the non-volatile memory 220.

Figure 3:
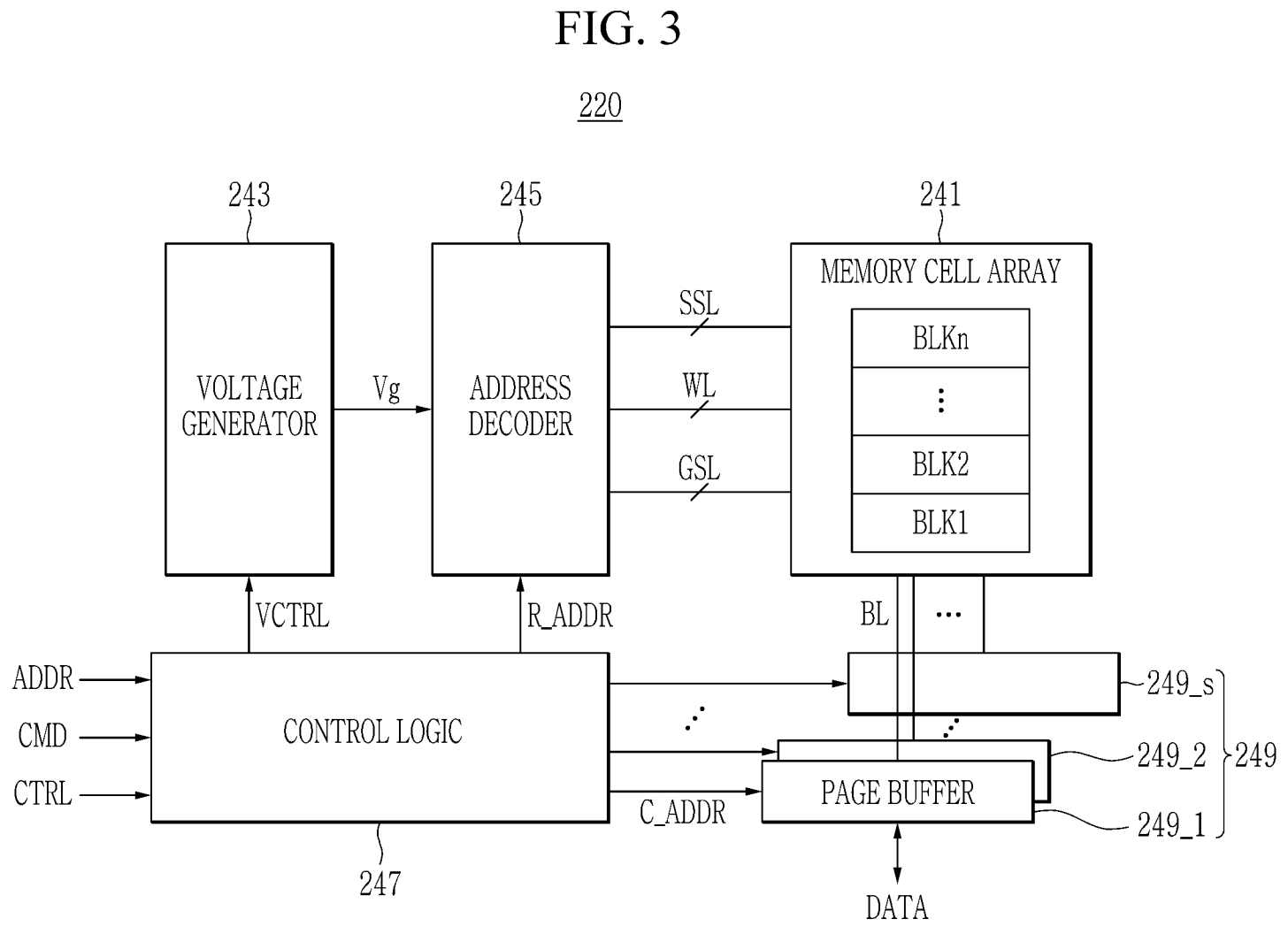

FIG. 3 is a schematic block diagram illustrating an example of the non-volatile memory of FIG. 2, according to an embodiment.

The non-volatile memory 220 may include a memory cell array 241, a voltage generator 243, an address decoder 245, a page buffer 249, and a control logic 247.

The memory cell array 241 may include a plurality of memory blocks (e.g., first memory block BLK1, second memory block BLK2, to n-th memory block BLKn, hereinafter referred to generally as "BLK", where n is a positive integer greater than one (1)). Each of the plurality of memory blocks BLK may be connected to the address decoder 245 through a wordline WL, a string selection line SSL, and a ground selection line GSL, and may be connected to the page buffer 249 through a bitline BL.

The memory cell array 241 may include a plurality of memory cells disposed in regions where a plurality of wordlines WL and a plurality of bitlines BL cross. Each of the plurality of memory cells may be and/or may include cell types such as, but not limited to, a single-level cell (SLC), a multi-level cell (MLC), a triple-level cell (TLC), a quad-level cell (QLC), and the like.

The memory cell array 241 may be and/or may include a non-volatile memory cell. For example, the memory cell array 241 may be and/or may include 2-dimensional (2D) NAND memory array and/or 3-dimensional (3D) vertical NAND (VNAND) memory array.

The voltage generator 243 may receive electrical power, regulate the voltage signal Vg for performing memory operations based on a voltage control signal VCTRL, and may transmit the voltage signal Vg to the memory cell array 241 through the address decoder 245. The voltage generator 243 may generate various types of voltages for performing various memory operations, such as, but not limited to, a program operation and an erase operation with respect to the memory cell array 241 based on the voltage control signal VCTRL.

The address decoder 245 may be connected to the memory cell array 241 through the wordline WL, the string selection line SSL, and the ground selection line GSL. The address decoder 245 may select at least one from among the plurality of memory blocks BLK by decoding a row address R_ADDR, and provide the voltage signal Vg supplied from the voltage generator 243 to the wordline WL.

The page buffer 249 may include a first page buffer 249_1, a second page buffer 249_2, to an s-th page buffer 249_s, where s is a positive integer greater than two (2). The first to s-th page buffers 249_1 to 249_s may connect to the plurality of memory cells through the plurality of bitlines BL, respectively. A page buffer 249 may select at least one bitline among the plurality of bitlines BL based on a column address C_ADDR. The page buffer 249 may operate as a write driver and/or a detection amplifier depending on the operation mode (e.g., write mode, read mode).

The control logic 247 may provide respective control signals related to memory operations to the voltage generator 243, the address decoder 245, and the page buffer 249. The control logic 247 may control an overall operation of the non-volatile memory 220. The control logic 247 may control the non-volatile memory 220 by using an internal control signal based on at least one of an address ADDR, a command CMD, and a control signal CTRL received from the storage controller 210.

Figure 4:
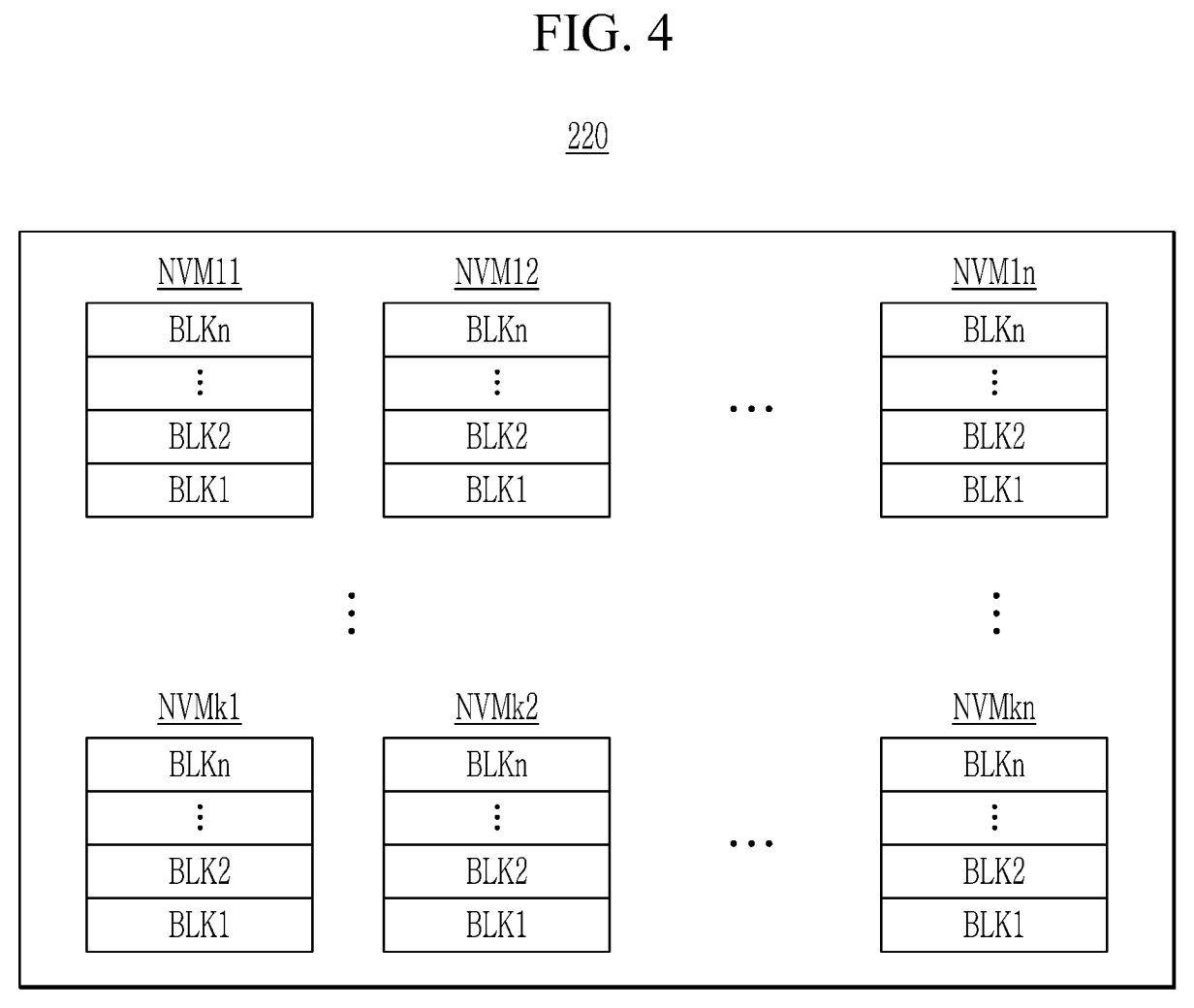
Figure 5:
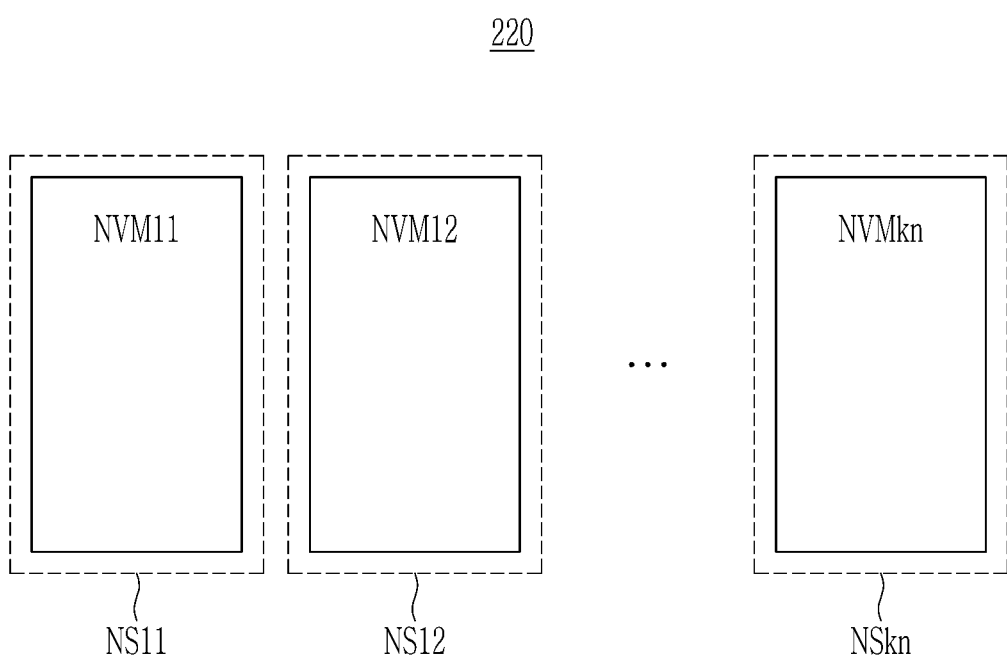
Figure 6:
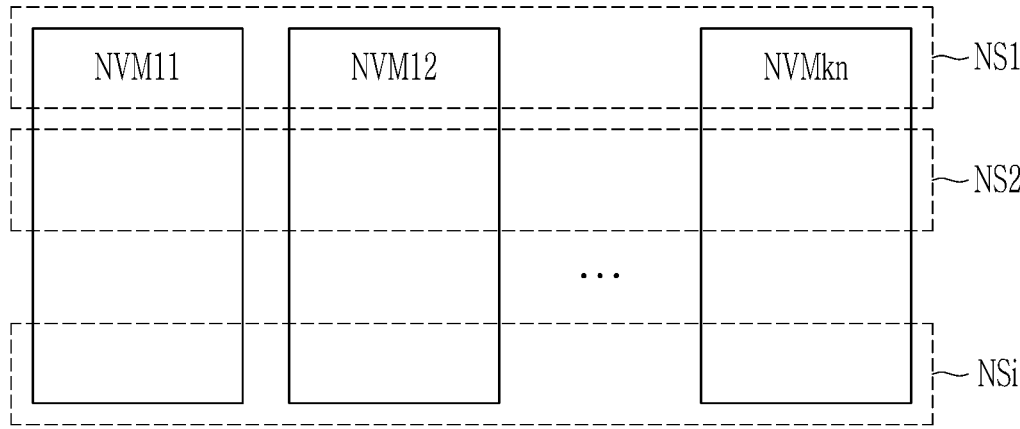

FIGS. 4 to 6 are drawings depicting a namespace allocated in a non-volatile memory, according to an embodiment.

FIG. 4 is a drawing showing a physical structure of a non-volatile memory, according to an embodiment. FIGS. 5 and 6 are illustrating a namespace allocated in the non-volatile memory, according to an embodiment.

Referring to FIG. 4, the non-volatile memory 220 may include a plurality of non-volatile memories (e.g., first non-volatile memory NVM11, second non-volatile memory NVM12, to n-th non-volatile memory NVM1n, to k1-th non-volatile memory NVMk1, k2-th non-volatile memory NVMk2, to kn-th non-volatile memory NVMkn, where k is a positive integer greater than zero (0)). Each of a plurality of non-volatile memories NVM11 to NVMkn may include a plurality of memory blocks BLK (e.g., first memory block BLK1, second memory block BLK2, to n-th memory block BLKn). Although in FIG. 4 the non-volatile memory 220 is illustrated with the plurality of non-volatile memories NVM11 to NVMkn, the present disclosure is not limited thereto. For example, the non-volatile memory 220 may further include circuits and/or components described with reference to FIG. 3 that may be configured to perform at least one of a program operation, read operation, and erase operation, and the like, with respect to the memory blocks BLK of each of the plurality of non-volatile memories NVM11 to NVMkn.

In an embodiment, the memory blocks BLK may be configured in a substantially similar and/or the same manner as each other. Alternatively or additionally, each of the memory blocks BLK of each of the plurality of non-volatile memories NVM11 to NVMkn may be assigned different physical addresses.

FIG. 5 shows an example of generating and setting a plurality of namespaces (e.g., a first namespace NS11, a second namespace NS12, to a kn-th namespace NSkn) with respect to the non-volatile memory 220. For example, the plurality of non-volatile memories NVM11 to NVMkn may be included in a storage device, and accordingly, the plurality of namespaces NS11 to NSkn may be included in one storage device. However, the present disclosure is not limited thereto.

In an example of FIG. 5, one namespace may be generated and set with respect to one non-volatile memory from among the plurality of non-volatile memories NVM11 to NVMkn. For example, the first namespace NS11 may be generated and set with respect to an entire area of the first non-volatile memory NVM11, the first namespace NS12 may be generated and set with respect to an entire area of the non-volatile memory NVM12, and the kn-th namespace NSkn may be generated and set with respect to an entire area of the kn-th non-volatile memory NVMkn. However, the present disclosure is not limited thereto. For example, a namespace may be generated and set with respect to two or more non-volatile memories.

In one embodiment, capacities of the plurality of namespaces NS11 to NSkn may be identical to and/or different from each other. Although FIG. 5 illustrates that the number of the namespaces NS11 NSkn and the number of the plurality of non-volatile memories NVM11 to NVMkn are the same, the present disclosure is not limited thereto. For example, the number of the namespaces and the number of the non-volatile memories may be variously changed.

FIG. 6 shows another example of generating and setting the plurality of namespaces (e.g., first namespace NS1, second namespace NS2, to i-th namespace NSi, where i is a positive integer greater than one (1)) with respect to the plurality of non-volatile memories NVM11 to NVMkn. The plurality of namespaces NS1 to NSi may include and/or may be similar in many respects to the plurality of namespaces described above with reference to FIG. 5, and may include additional features not mentioned above. Consequently, repeated descriptions of the plurality of namespaces NS1 to NSi described above with reference to FIG. 5 may be omitted for the sake of brevity.

In an example of FIG. 6, one namespace may be generated and set with respect to all of the plurality of non-volatile memories NVM11 to NVMkn. For example, the first namespace NS1 may be generated and set with respect to a partial area of each of the plurality of non-volatile memories NVM11 NVMkn, the second namespace NS2 may be generated and set with respect to another partial area of each of the plurality of non-volatile memories NVM11 to NVMkn, and the i-th namespace NSi may be generated and set with respect to another partial area of each of the plurality of non-volatile memories NVM11 to NVMkn.

It is to be understood that generation and setting of the namespaces may be variously changed. For example, one namespace may be generated and set with respect to an entire area and/or a partial area of some non-volatile memories (e.g., first non-volatile memory NVM11, second non-volatile memory NVM12). Alternatively or additionally, capacities of the plurality of namespaces NS1 NSi may be identical to and/or different from each other.

In one embodiment, the NSM 215 may, upon receiving the exposure control command Exp_cmd by the first user from the host 100, set a part of the plurality of namespaces as the hidden namespace. In one embodiment, when the NSM 215 sets a part of the plurality of namespaces as the hidden namespace based on the exposure control command Exp_cmd, the hidden namespace may not be exposed to other users excluding the first user. That is, since the second user may not conceive (e.g., create) the hidden namespace, access of the second user with respect to the hidden namespace may be blocked.

Figure 7:
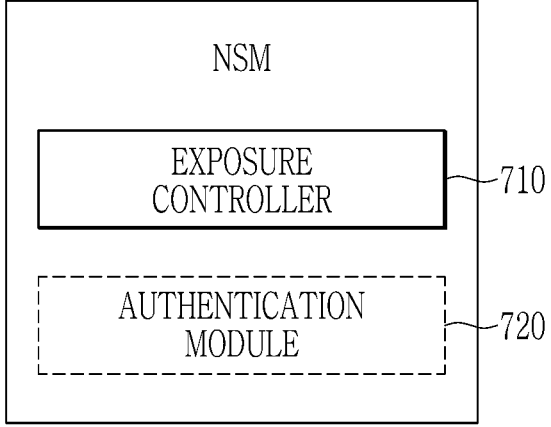
FIG. 7 is a block diagram showing a configuration of a namespace administrator (NSM), according to an embodiment.
Figure 8:
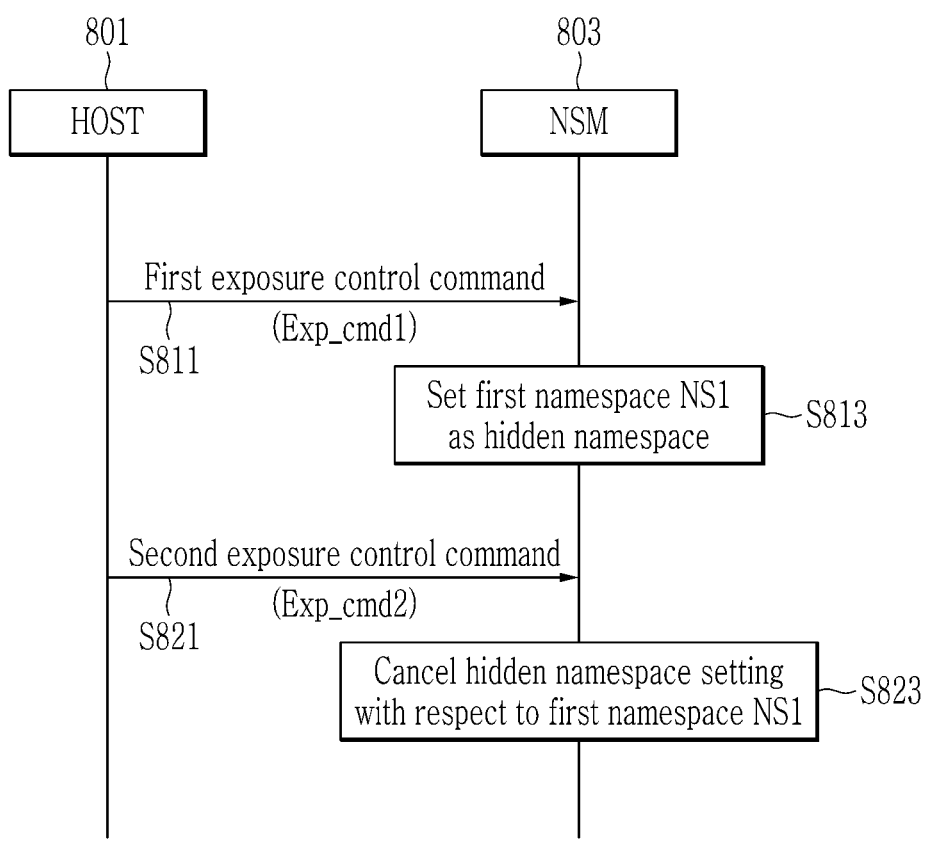
FIGS. 8 and 9 are flowcharts illustrating an example of an operation of a storage system, according to an embodiment.
Figure 9:
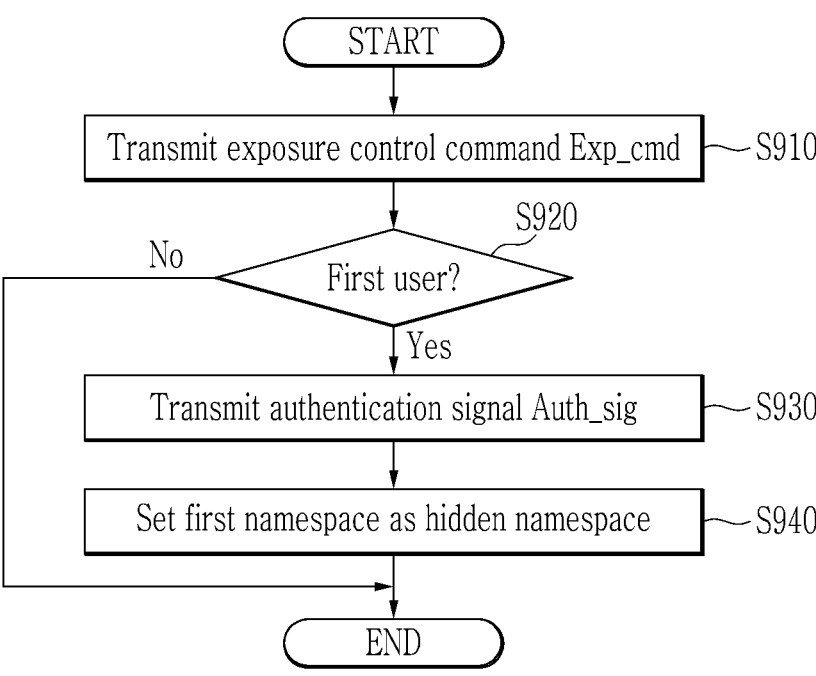

FIGS. 7 to 9 are drawings illustrating a setting method of a hidden namespace, according to an embodiment. FIG. 7 is a block diagram showing a configuration of a NSM, according to an embodiment. FIGS. 8 and 9 are flowcharts illustrating an example of an operation of a storage system, according to an embodiment.

In one embodiment, a NSM 700 may include an exposure controller 710. In one embodiment, the NSM 700 may further include an authentication module 720. The exposure controller 710 may control whether or not to expose the namespace based on the instruction of the host. The authentication module 720 may authenticate that the instruction of the host is by the first user.

An example of an operation method of the NSM 700, according to an embodiment, is described with reference to FIGS. 8 and 9.

In one embodiment, a host 801 may instruct to set the particular namespace (e.g., first namespace NS1) as the hidden namespace from among the plurality of namespaces NS11 to NSi within the non-volatile memory 220. In one embodiment, at operation S811, a NSM 803 may receive a first exposure control command Exp_cmd1 for setting the first namespace NS1 as the hidden namespace from among the plurality of namespaces NS1 to NSi from the host 801. The first exposure control command Exp_cmd1 may include a namespace identifier (NSID) of the first namespace NS1 to be set as the hidden namespace, together with a command for instructing to set the first namespace NS1 as the hidden namespace. In one embodiment, the first exposure control command Exp_cmd1 may be transferred (e.g., transmitted) in the form of a vendor-specific command.

In one embodiment, at operation S813, the NSM 803 may set the first namespace NS1 as the hidden namespace based on the first exposure control command Exp_cmd1 received from the host 801. For example, when the NSM 803 receives the first exposure control command Exp_cmd1, the exposure controller 710 in the NSM 803 may limit the exposure of the first namespace NS1 with respect to other users (e.g., the second user). When a first namespace NS1 is set as the hidden namespace, the first namespace NS1 may be exposed only to the first user, and the second user may not know whether the first namespace NS1 exists. That is, the second user may not be permitted to access the first namespace NS1, and may not be permitted to change and/or delete the data stored in the first namespace NS1. Therefore, security with respect to the data stored in the particular namespace (e.g., first namespace NS1) may be strengthened.

In one embodiment, the host 801 may instruct the NSM 803 to cancel the hidden namespace setting with respect to the first namespace NS1. In one embodiment, at operation S821, the NSM 803 may receive, from the host 801, a second exposure control command Exp_cmd2 for cancelling the hidden namespace setting with respect to the first namespace NS1. In one embodiment, the second exposure control command Exp_cmd2 may be transferred (e.g., transmitted) in the form of a vendor-specific command.

In one embodiment, at operation S823, the NSM 803 may cancel the hidden namespace setting with respect to the first namespace NS1 based on the second exposure control command Exp_cmd2 received from the host 801. For example, when the NSM 803 receives the second exposure control command Exp_cmd2, the exposure controller 710 in the NSM 803 may cancel the exposure limit of the first namespace with respect to the second user. That is, the first namespace NS1 may be exposed to the second user. Consequently, the second user may be permitted to access the first namespace NS1.

FIG. 9 is a flowchart illustrating an example of an operation of a storage system, according to an embodiment. The operations of the storage system described with reference to FIG. 9 may include and/or may be similar in many respects to the operations of the storage system described above with reference to FIG. 8, and may include additional features not mentioned above. Consequently, repeated descriptions of the operations of the storage system described above with reference to FIG. 8 may be omitted for the sake of brevity.

In one embodiment, at operation S910, the host may transmit the exposure control command Exp_cmd for setting the first namespace NS1 as the hidden namespace from among the plurality of namespaces NS1 to NSi in the non-volatile memory 220 to the NSM 700. The exposure control command Exp_cmd may include the NSID of the first namespace NS1 to be set as the hidden namespace, together with a command for instructing to set the first namespace NS1 as the hidden namespace. The exposure control command Exp_cmd may further include a security key for user verification.

In one embodiment, at operation S920, the NSM 700 may receive the exposure control command Exp_cmd from the host 801, and may perform an authentication operation that authenticates whether the command was requested by the first user. For example, the authentication module 720 in the NSM 700 may authenticate that the instruction was transmitted from the first user by using the security key in the exposure control command Exp_cmd. For example, the security key used for user authentication may be pre-stored in the authentication module 720, and the authentication module 720 may perform the authentication operation by comparing the pre-stored security key and the security key received from the user in the exposure control command Exp_cmd.

At operation S930, the authentication module 720 may, upon authenticating that the exposure control command Exp_cmd is by the first user, transmit an authentication signal Auth_sig, notifying that the exposure control command Exp_cmd is by the first user, to the exposure controller 710 in the NSM 700. In one embodiment, the authentication module 720 may be implemented as a firmware. However, the present disclosure is not limited thereto, and the authentication module 720 may be implemented as hardware (e.g., circuitry), software, and/or a combination thereof.

In one embodiment, at operation S940, the exposure controller 710 of the NSM 700 may, upon receiving the authentication signal Auth_sig from the authentication module 720, set the first namespace NS1 from among the plurality of namespaces NS1 to NSi as the hidden namespace based on the exposure control command Exp_cmd.

In an embodiment, the operation of canceling the hidden namespace setting described with reference to FIG. 8 may be similarly performed similarly with regard to the operations described with reference to in FIG. 9.

Figure 10:
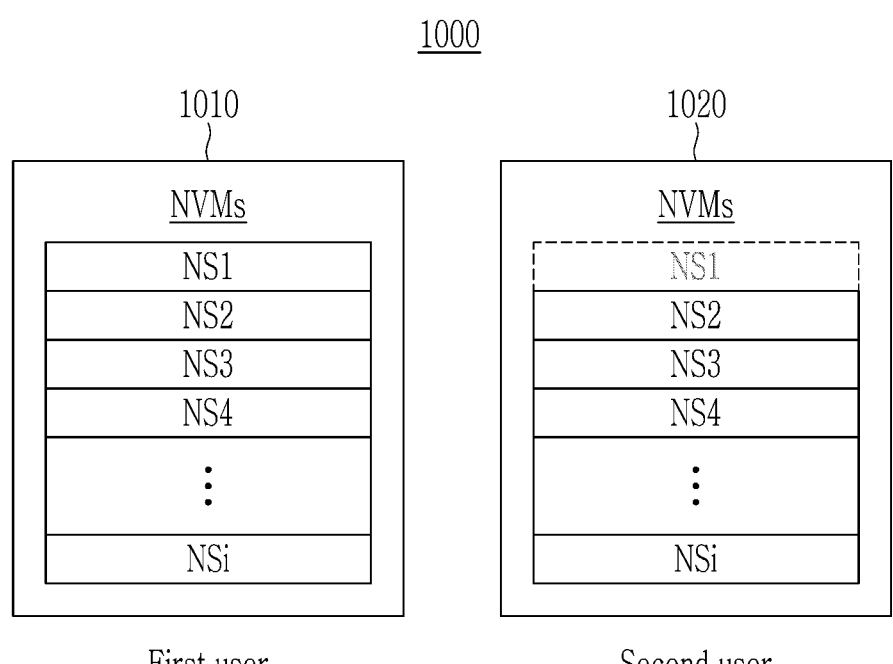
FIG. 10 is a drawing depicting a namespace list depending on the user, according to an embodiment.

FIG. 10 is a drawing depicting a namespace list depending on the user, according to an embodiment. Referring to FIG. 10, the namespace list 1000 may be exposed differently depending on the user.

As described above with reference to FIG. 6, non-volatile memories of a storage device may include the plurality of namespaces NS1 to NSi. A storage device, according to an embodiment, may, when the first user requests a namespace list of namespaces existing in the non-volatile memory NVMs (e.g., the first to i-th namespaces NS1 NSi) may output the list of all namespaces 1010 in the non-volatile memory. However, when the second user requests a namespace list existing in the non-volatile memory, the storage device may exclude the hidden namespace (e.g., first namespace NS1) from the list of namespaces 1020 that is output by the storage device. That is, the list of namespaces 1020 (e.g., the second namespace NS2, to the i-th namespace NSi) may exclude the first namespace NS1 from the output. Therefore, since the second user may not be aware of the hidden namespace NS1, access of the second user with respect to the hidden namespace NS1 may be blocked. Thus, the storage device may enforce isolation of other users, excluding the first user, with respect to the data in the hidden namespace NS1, and as such, providing potentially improved security when compared to related storage devices.

Figure 11:
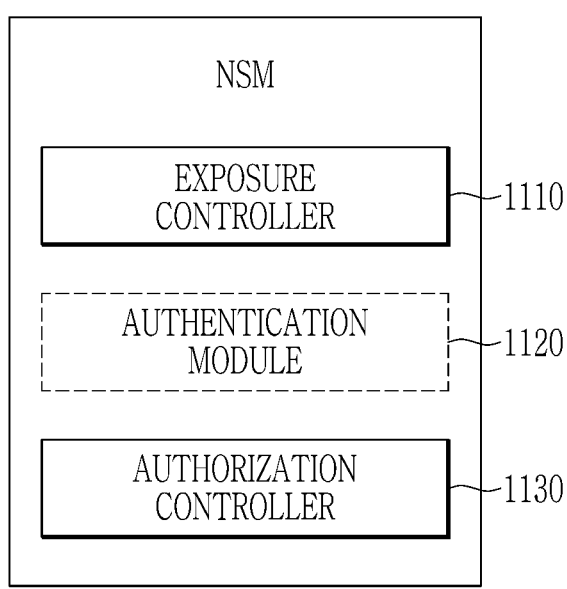
FIG. 11 is a block diagram showing a configuration of a NSM, according to an embodiment.
Figure 12:
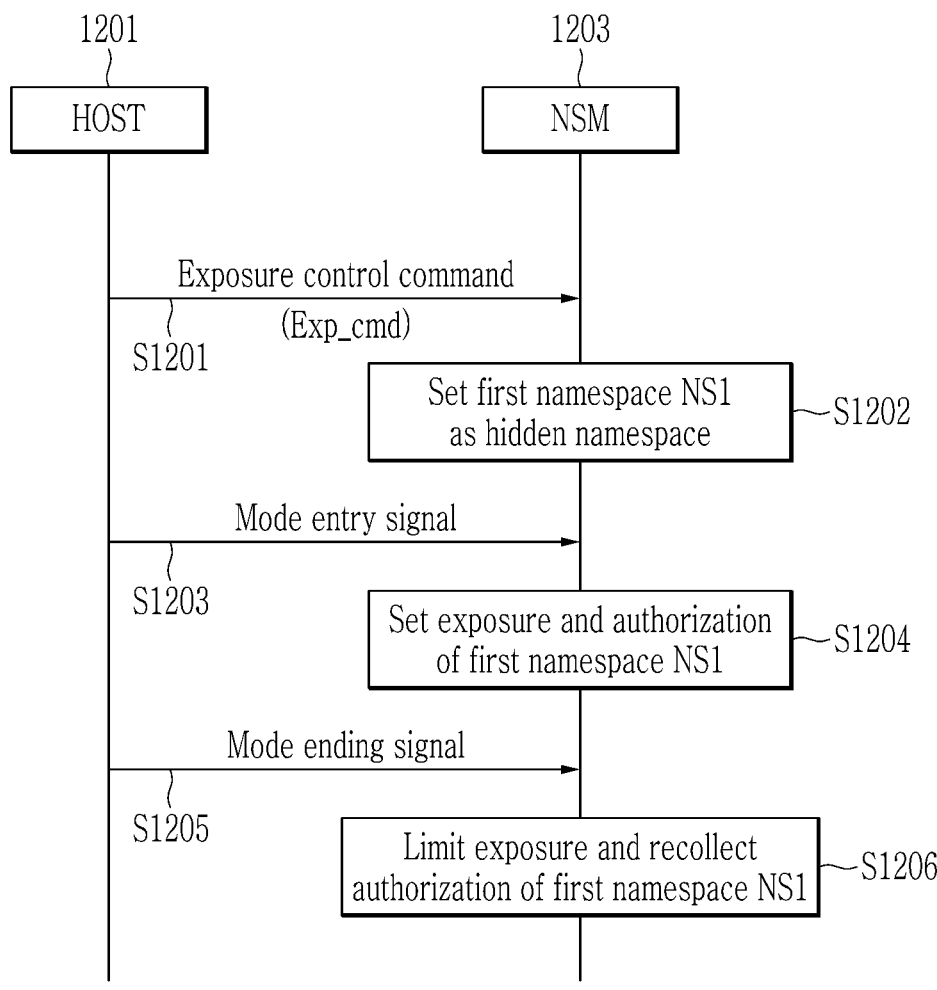
FIGS. 12 and 13 are flowcharts depicting an example of an operation of a storage system, according to an embodiment.
Figure 13:
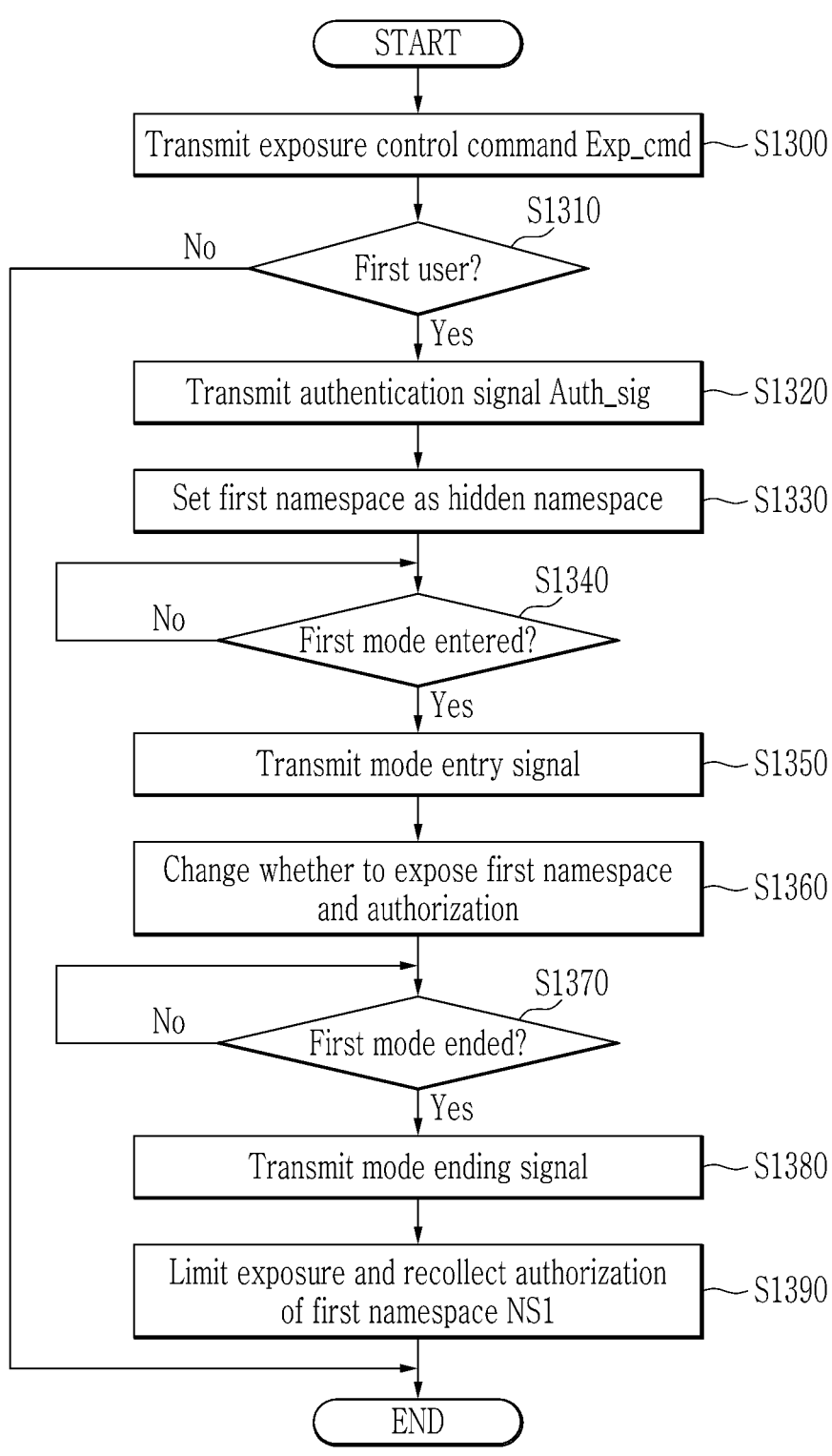

FIGS. 11 to 13 are drawings showing an example of a setting method of a hidden namespace, according to an embodiment. In particular, FIG. 11 is a block diagram showing a configuration of a NSM, according to an embodiment. FIGS. 12 and 13 are flowcharts depicting an example of an operation of a storage system, according to an embodiment.

In one embodiment, a NSM 1100 may include an authorization controller 1130, an exposure controller 1110, and an authentication module 1120. The exposure controller 1110 may determine whether or not to expose the namespace, based on the command of the host. The authentication module 1120 may identify and/or authenticate the user that sent the corresponding command, based on the command of the host.

The exposure controller 1110 and the authentication module 1120 of FIG. 11 may include and/or may be similar in many respects to the exposure controller 710 and the authentication module 720 described above with reference to FIG. 7, and may include additional features not mentioned above. Consequently, repeated descriptions of the exposure controller 1110 and the authentication module 1120 described above with reference to FIG. 7 may be omitted for the sake of brevity.

In one embodiment, the authorization controller 1130 may control access authorization with respect to the hidden namespace based on the instruction of the host. For example, when the particular namespace (e.g., first namespace NS1) is set as the hidden namespace by the command of the host, other users excluding the first user may not perceive (e.g., be able to access) the hidden namespace. However, at the time of setting the particular namespace as the hidden namespace, the host may instruct to expose the hidden namespace when a predetermined condition is satisfied, and/or may instruct to assign a predetermined authorization with respect to the hidden namespace to the second user. In one embodiment, the predetermined condition may be and/or may include a condition in which the storage system (e.g., storage system 10 of FIG. 1) and/or the storage device (e.g., storage device of FIG. 1) enters a particular mode. Alternatively or additionally, the predetermined condition may be and/or may include a predetermined time period during which the storage system and/or the storage device may enter the particular mode. For example, the particular mode may be and/or may include a system recovery mode and/or a software update mode. However, the present disclosure is not limited thereto. In one embodiment, the predetermined authorization may be and/or may include the read-only authorization and/or the write authorization. However, the present disclosure is not limited thereto. An example of an operation method is described with reference to FIGS. 12 and 13.

In one embodiment, a host 1201 may instruct to set the particular namespace (e.g., the first namespace NS1) as the hidden namespace from among the plurality of namespaces NS1 to NSi within the non-volatile memory 220. In one embodiment, at operation S1201, a NSM 1203 may receive, from the host 1201, the exposure control command Exp_cmd for setting the first namespace NS1 as the hidden namespace from among the plurality of namespaces NS1 to NSi. The exposure control command Exp_cmd may include the NSID of the first namespace NS1 to be set as the hidden namespace, together with a command for instructing to set the first namespace NS1 as the hidden namespace. The exposure control command Exp_cmd may further include timing and/or authorization conditions for exposing the hidden namespace and/or assigning the limited authorization. In one embodiment, the exposure control command Exp_cmd may follow and/or be compliant with a vendor-specific command format.

In one embodiment, at operation S1202, the NSM 1203 may set the first namespace NS1 as the hidden namespace based on the exposure control command Exp_cmd received from the host 1201. For example, when the NSM 1203 receives the exposure control command Exp_cmd, the exposure controller 1110 in the NSM 1203 may limit the exposure of the first namespace NS1 with respect to the second user.

In one embodiment, the host 1201 may further transmit a signal notifying that a particular timing corresponding to timing condition in the exposure control command Exp_cmd has been entered. For example, at operation S1203, when the storage system and/or the storage device enters the particular mode corresponding to timing condition in the exposure control command Exp_cmd, the host 1201 may transmit the mode entry signal notifying that the storage system and/or the storage device has entered the particular mode to the NSM 1203. The authorization controller 1130 of the NSM 1203 may expose the first namespace NS1, based on the mode entry signal. At operation S1204, access authorization of the second user with respect to the hidden namespace may be changed according to the authorization information provided by the host 1201.

As an example, the particular mode may refer to a basic input/output system (BIOS) recovery mode. The BIOS may refer to a set of programs in the operation system that may be configured to control the computer to process basic functions for driving an input/output device and/or a peripheral device when a computer is powered on. The recovery mode may refer to a mode for recovering the system in cases such as when the system does not boot up normally. The first namespace NS1 that may be designated as the hidden namespace may be and/or may include an area where the BIOS program may be stored. If the system does not boot normally during system booting and a command to enter the recovery mode is entered, the system may enter the BIOS recovery mode. When the storage system enters the recovery mode, the host 1201 may transmit the mode entry signal notifying entering the recovery mode to the NSM 1203, and the NSM 1203 may expose the first namespace NS1 based on the mode entry signal. The second user may access the first namespace with the limited authorization. The limited authorization may be and/or may include the read-only authorization.

As another example, the particular mode may refer to the software update mode. The first namespace NS1 that may be designated as the hidden namespace may be and/or may include an area where software to be updated is stored. When the system enters the update mode, the host 1201 may transmit the mode entry signal notifying entering the update mode to the NSM 1203, and the NSM 1203 may expose the first namespace NS1 based on the mode entry signal. The second user may access the first namespace with the limited authorization. The limited authorization may be and/or may include the write authorization. Although the BIOS recovery mode and the update mode are described as examples, the present disclosure is not limited thereto, and there may be various modes for the storage system 10 and/or the storage device 200.

In one embodiment, at operation S1205, when the particular mode of the storage system or the storage device is ended, the host 1201 may transmit the mode ending signal notifying that the particular mode has ended to the NSM 1203. At operation S1206, the authorization controller 1130 of the NSM 1203 may, based on the mode ending signal, limit the exposure of the first namespace NS1, and recollect (reset) access authorization with respect to the first namespace NS1 assigned to the second user.

FIG. 13 is a flowchart depicting an example of an operation of a storage system, according to an embodiment. The operations of the storage system described with reference to FIG. 13 may include and/or may be similar in many respects to the operations of the storage system described above with reference to FIG. 12, and may include additional features not mentioned above. Consequently, repeated descriptions of the operations of the storage system described above with reference to FIG. 12 may be omitted for the sake of brevity.

Referring to FIGS. 11 and 13, in one embodiment, at operation S1300, the host may transmit the exposure control command Exp_cmd for setting the first namespace NS1 as the hidden namespace from among the plurality of namespaces NS1 to NSi in the non-volatile memory 220 to the NSM 1100. The exposure control command Exp_cmd may include the NSID of the first namespace NS1 to be set as the hidden namespace, together with a command for instructing to set the first namespace NS1 as the hidden namespace. The exposure control command Exp_cmd may further include timing and authorization conditions for exposing the hidden namespace and assigning the limited authorization to the hidden namespace. The exposure control command Exp_cmd may further include a security key for user verification.

In one embodiment, at operation S1310, the NSM 215 may receive the exposure control command Exp_cmd from the host, and may perform an authentication operation to authenticate whether the command was requested by the first user. For example, the authentication module 1120 (see FIG. 11) in the NSM 1100 may authenticate that the instruction was transmitted from the first user by using the security key in the exposure control command Exp_cmd. For example, the security key for user authentication may be pre-stored in the authentication module 1120, and the authentication module 1120 may perform the authentication operation by comparing the pre-stored security key and the security key received from the user.

At operation S1320, the authentication module 1120 may, upon authenticating that the exposure control command Exp_cmd is by the first user, transfer the authentication signal Auth_sig, thus notifying that the exposure control command Exp_cmd is by the first user, to the exposure controller 1110 in the NSM 1100.

In one embodiment, at operation S1330, the exposure controller 1110 of the NSM 1100 may, upon receiving the authentication signal Auth_sig from the authentication module 1120, set the first namespace NS1 from among the plurality of namespaces NS1 to NSi as the hidden namespace based on the exposure control command Exp_cmd.

In one embodiment, at operation S1340, the storage system and/or the storage device may enter the particular mode corresponding to the timing condition in the exposure control command Exp_cmd.

In one embodiment, at operation S1350, when the storage system and/or the storage device enters the first mode, the host may transfer the mode entry signal notifying that the storage system and/or the storage device has entered the first mode.

In one embodiment, at operation S1360, when the storage system or the storage device enters the first mode, the authorization controller 1130 in the NSM 1100 may expose the first namespace set as the hidden namespace, and may change access authorization with respect to the first namespace of the second user.

In one embodiment, at operation S1370, the storage system and/or the storage device may end the first mode.

In one embodiment, at operation S1370, when the first mode of the storage system and/or the storage device is ended, the host 1201 may transfer the mode ending signal notifying that the first mode of the storage system and/or the storage device has ended.

In one embodiment, at operation S1390, when the first mode of the storage system and/or the storage device is ended, the authorization controller 1130 in the NSM 1100 may terminate the exposure of the first namespace NS1 set as the hidden namespace, and recollect (reset) access authorization of other users assigned to the first namespace NS1.

A storage device, according to an embodiment, may enforce isolation of other users excluding the first user with respect to the data in the hidden namespace, providing potentially improved security, when compared to related storage devices. Alternatively or additionally, aspects of the present disclosure may enable access of the other users in the designated mode, thus allowing flexible management of the namespace.

Figure 14:
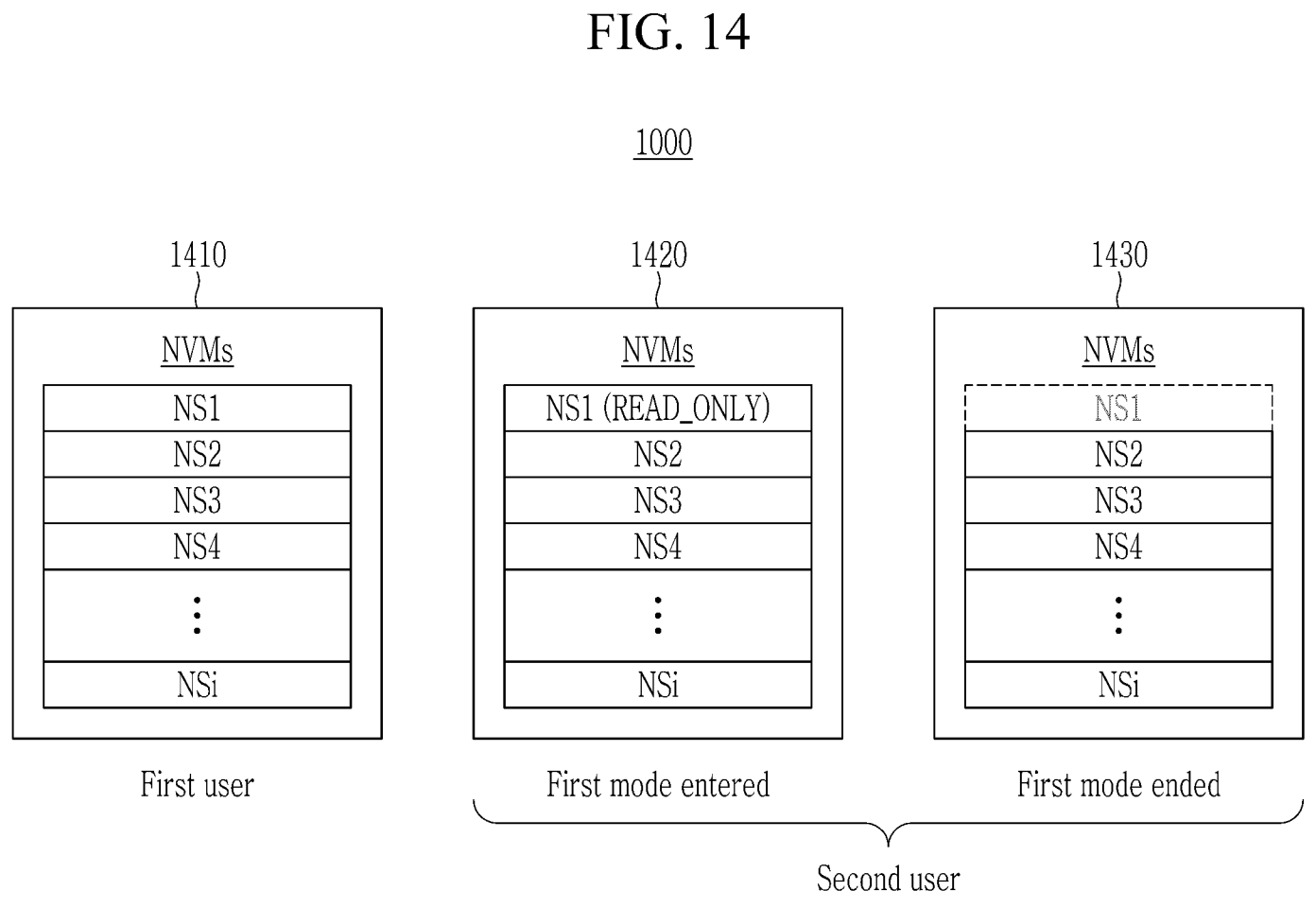

FIG. 14 is a drawing illustrating a namespace list depending on the user, according to an embodiment. Referring to FIG. 14, a namespace list 1400 may be exposed differently, depending on the user and depending on the mode of storage device and/or system.

As described above with reference to FIG. 10, when the first namespace NS1 from among the plurality of namespaces NS1 to NSi is set as the hidden namespace, the first namespace may be exposed only to the first user and the first namespace list 1410 may be output to the first user. However, when the storage system and/or the storage device enters the particular mode (e.g., the first mode), the first namespace may be exposed, and limited access authorization (e.g., the read-only authorization) with respect to the first namespace of other users may be assigned and the second namespace list 1420 may be output to second users (e.g., listing first namespace NS1 as read-only). Subsequently, when the first mode with respect to the storage system and/or the storage device is ended, the exposure of the first namespace is terminated, and access authorization of other users assigned to the first namespace may be recollected and the third namespace list 1430 may be output to second users (e.g., excluding the hidden namespace).

Figure 15:
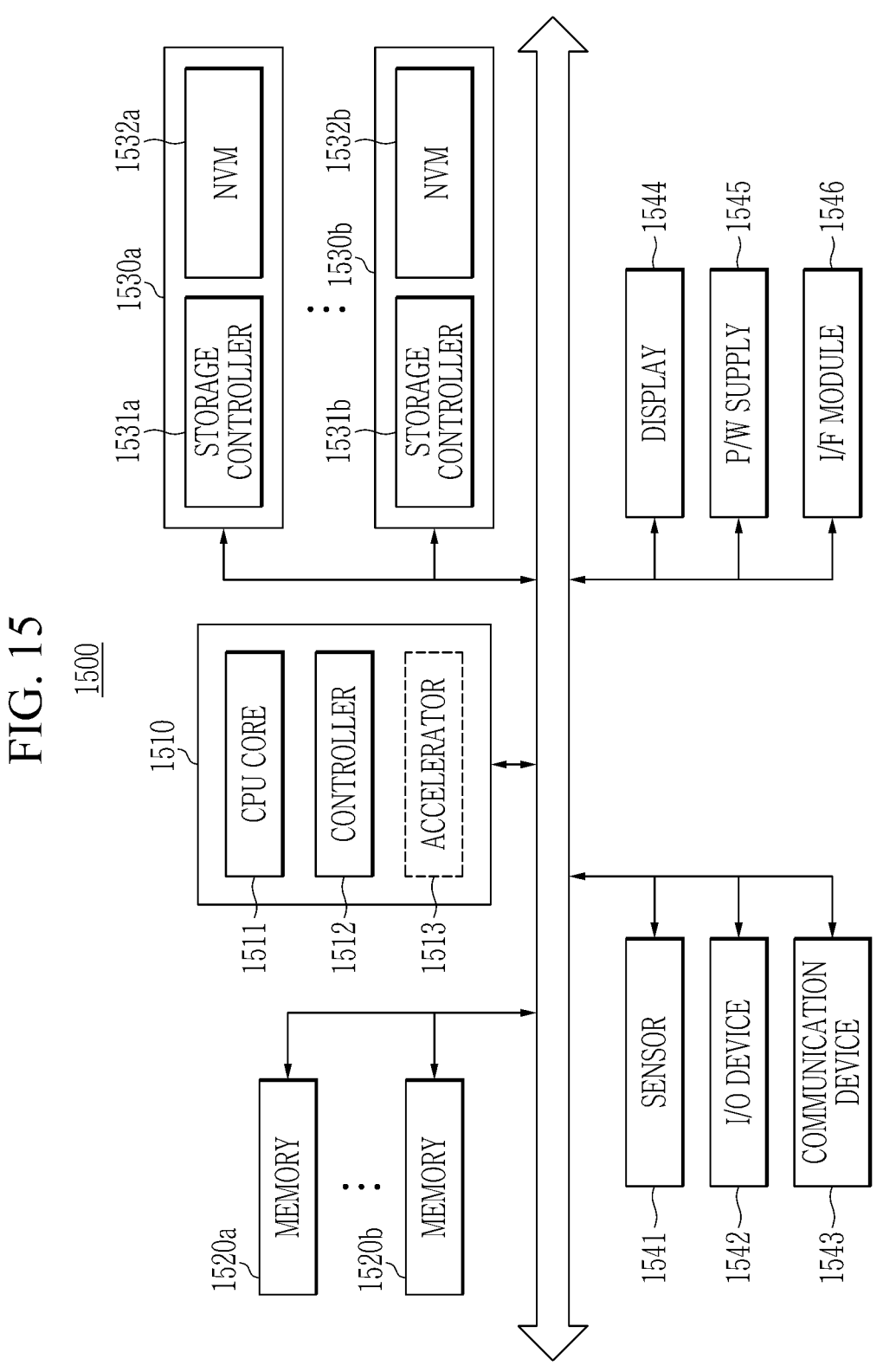
FIG. 15 is an exemplary block diagram depicting a storage system, according to some embodiments.

FIG. 15 is an exemplary block diagram depicting a storage system, according to some embodiments.

A storage system 1500 of FIG. 15 may be and/or may include a mobile system such as, but not limited to, a portable communication terminal (e.g., mobile phone), a smart phone, a tablet PC, a wearable device, a healthcare device, an IoT device, and the like. However, the present disclosure is not limited thereto. For example, the storage system 1500 of FIG. 15 may be and/or may include a personal computer, a laptop computer, or an automotive device (e.g., a navigation device, a black box, an automotive electronic device), and the like.

The storage system 1500 of FIG. 15 may include a main processor 1510, memories (e.g., first memory 1520a to second memory 1520b) and storage devices (e.g., first storage device 1530a to second storage device 1530b). The storage system 1500 may further include a sensor 1541, an input/output (I/O) device 1542, communication device 1543, a display 1544, power (P/W) supply 1545, and an interface (I/F) module 1546.

The main processor 1510 may control the overall operation of the storage system 1500. For example, the main processor 1510 may control the operation of other components constituting the storage system 1500. The main processor 1510 may be implemented as a general-purpose processor, a dedicated processor, an application processor, or the like.

The processor 1510 may include one or more CPU cores 1511, and may further include a controller 1512 for controlling the first to second memories 1520a to 1520b and/or the first to second storage devices 1530a to 1530b. In one embodiment, the main processor 1510 may further include an accelerator 1513, which may be and/or may include a dedicated circuit for high-speed data computations such as, but not limited to, an artificial intelligence (AI) data computation. The accelerator 1513 may include a graphics processing unit (GPU), a neural processing unit (NPU), a data processing unit (DPU), and/or the like, and may be implemented as a chip physically independent and/or separate from other components of the main processor 1510.

The first to second memories 1520a to 1520b may be used as a main memory device of the storage system 1500, may include a volatile memory such as, but not limited to, static random access memory (SRAM) and/or dynamic random access memory (DRAM). The first to second memories 1520a to 1520b may also include a non-volatile memory such as, but not limited to, a flash memory, phase-change random access memory (PRAM), resistive random-access memory (RRAM), and/or the like. The first to second memories 1520a to 1520b may be implemented in the same package as the main processor 1510.

The first to second storage devices 1530a to 1530b may be and/or may include the storage device 200, according to some embodiments, as described above with reference to FIGS. 1 to 14.

The first to second storage devices 1530a to 1530b may include first to second storage controllers 1531a to 1531b and first to second non-volatile memories (NVM) 1532a to 1532b configured to store data under the control of the first to second storage controllers 1531a to 1531b. The first to second non-volatile memories 1532a and 1532b may be and/or may include a flash memory of a 2D structure and/or a 3D V-NAND structure may. However, the present disclosure is not limited thereto, and the first to second-volatile memories 1532a and 1532b may be and/or may include other types of non-volatile memories such as, but not limited to, PRAM, RRAM, and/or the like.

The first to second storage devices 1532a to 1532b may be included in the storage system 1500 in a state physically separated from the main processor 1510, and/or may be implemented in the same package as the main processor 1510. In addition, the first to second storage devices 1532a to 1532b may be implemented as a solid-state drive (SSD) and/or a memory card, and may be detachably attached from other components of the storage system 1500 through an interface such as the interface module 1546. The first to second storage devices 1532a to 1532b may be and/or may include a device applied with a standard protocol such as universal flash storage (UFS), embedded multi-media card (eMMC), or NVMe. However, the present disclosure is not limited thereto.

In one embodiment, the first to second non-volatile memories 1532a to 1532b in the first to second storage devices 1532a to 1532b, respectively, may include the plurality of namespaces. As the storage system 1500 is used by the plurality of users, the first to second storage devices 1532a to 1532b may include the plurality of namespaces for isolating data for each user. In one embodiment, the storage devices 1532a and 1532b may include the NSM 215 for isolating data for each user.

In one embodiment, the first user of the storage system 1500 may set the first namespace NS1 as the hidden namespace from among the plurality of namespaces within the first to second non-volatile memories 1532a to 1532b. When the first namespace NS1 is set as the hidden namespace by the first user, the first namespace NS1 may not be exposed to other users excluding the first user. In one embodiment, when the predetermined condition is satisfied, the first user of the storage system 1500 may allow other users access to the hidden namespace. The predetermined condition may be and/or may include a timing condition.

In one embodiment, the first user from among the plurality of users may access the first to second storage devices 1532*a* to 1532*b* through a communication device 1543. In one embodiment, the first user and the first to second storage devices 1532*a* to 1532*b* may communicate according to a handshake method including, for example, a request signal REQ of the first user and a response signal ACK from the first to second storage devices 1532*a* to 1532*b*.

In one embodiment, the first to second storage devices 1532*a* to 1532*b* may include a deep learning model. Weights obtained through learning of a neural network model may be stored in the hidden namespace. In one embodiment, when the predetermined condition is satisfied, the first user may assign access authorization with respect to the hidden namespace of the accelerator 1513. In one embodiment, the first to second storage devices 1532*a* to 1532*b* may allow access with respect to the hidden namespace of the accelerator 1513, in order to perform data computation by utilizing the weights stored in the hidden namespace.

A user input device 1542 may receive various types of data input from the user of the storage system 1500, and may be and/or may include, but not be limited to, a touch pad, a keypad, a keyboard, a mouse, a microphone, and/or the like.

The sensor 1541 may detect various types of physical quantities that may be obtained from the outside of the storage system 1500, and may convert the detected physical quantities to electrical signals. The sensor 1541 may be and/or may include, but not be limited to, a temperature sensor, a pressure sensor, an illumination sensor, a position sensor, an acceleration sensor, a biosensor, a gyroscope sensor, and/or the like.

The communication device 1543 may perform sending and/or receiving of signals to and/or from other devices outside the storage system 1500, according to various communication protocols. The communication device 1540 may include an antenna, a transceiver, a modem, and/or the like.

The display 1544 may function as an output device that may output visual information to the user of the storage system 1500.

The power supply device 1545 may appropriately convert electrical power supplied from a power source (e.g., a battery) built in the storage system 1500 and/or an external power source, and may supply the converted electrical power to respective components of the storage system 1500.

The interface module 1546 may provide a connection between the storage system 1500 and an external device connected to the storage system 1500 and may be capable of communicating data with the storage system 1500. The interface module 1546 may be implemented in various interface methods such as ATA, SATA, external SATA (e-SATA), SCSI, SAS, PCI, PCIe, NVMe, Institute of Electrical and Electronics Engineers (IEEE) 1394 (FireWire), USB, secure digital (SD) card, MMC, eMMC, UFS, embedded UFS (eUFS), compact flash (CF) card interface, and the like.

While the present disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A storage device, comprising:
   a non-volatile memory comprising a plurality of namespaces to have shared access among a plurality of users; and
   a storage controller configured to:
   receive, from an external host, a first command requesting to control exposure of a first namespace from among the plurality of namespaces to be hidden from at least one user among the plurality of users, the first command comprising an identifier of the first namespace;
   based on the first command, set the first namespace as a hidden namespace, and prevent the first namespace from being exposed for access to the at least one user; and
   cancel, based on the storage device entering a first mode, the setting of the first namespace as the hidden namespace, and expose the hidden namespace during a first time period to the at least one user.

2. The storage device of claim 1, wherein the storage controller is further configured to:
   authenticate the external host by performing an authentication operation; and
   set the first namespace as the hidden namespace, based on a result of the performing of the authentication operation.

3. The storage device of claim 2, wherein the storage controller is further configured to:
   receive, from the external host, a host security key;
   access a pre-stored security key stored in the storage controller; and
   compare the pre-stored security key with the host security key.

4. The storage device of claim 1, wherein the storage controller is further configured to:
   receive, from the external host, a cancellation condition indicating to cancel the setting of the first namespace as the hidden namespace, based on the cancellation condition being satisfied;
   receive, from the external host, a reset condition indicating to restore the setting of the first namespace as the hidden namespace, based on the reset condition being satisfied;
   based on the cancellation condition being satisfied, cancel the setting of the first namespace as the hidden namespace such that the first namespace is exposed to the plurality of users; and
   based on the reset condition being satisfied, restore the setting of the first namespace as the hidden namespace.

5. The storage device of claim 1, wherein the storage controller is further configured to:
   receive, from the external host, a first signal indicating that the storage device entered the first mode; and
   cancel the setting of the first namespace as the hidden namespace.

6. The storage device of claim 1, wherein the storage controller is further configured to:
   receive, from the external host, a second signal indicating that the first mode has ended; and
   reset the setting of the first namespace as the hidden namespace.

7. The storage device of claim 1, wherein the storage controller is further configured to:
   assign, to the external host, an access authorization to data stored in the first namespace, based on the storage device entering the first mode.

8. The storage device of claim 7, wherein the access authorization comprises a read-only authorization.

9. The storage device of claim 2, wherein the storage controller is further configured to:

receive, from the external host, a second command requesting to cancel the setting of the first namespace as the hidden namespace; and cancel, based on the second command, the setting of the first namespace as the hidden namespace such that the first namespace is exposed for access to the plurality of users.

10. The storage device of claim 1, wherein the storage device comprises a solid-state drive (SSD).

11. A storage system, comprising:

a host; and a storage device comprising a non-volatile memory comprising a plurality of namespaces to have shared access among a plurality of users, the plurality of namespaces comprising a first namespace, wherein the storage device is configured to:

receive, from the host, a first command instructing to limit for access the first namespace;

set, based on the first command, the first namespace as a hidden namespace;

receive, from the host, an entry signal indicating that the storage system has entered a first mode; and cancel, based on the entry signal, the setting of the first namespace as the hidden namespace during a first time period.

12. The storage system of claim 11, wherein the storage device is further configured to:

receive, from the host, a security key;

authenticate the host by performing an authentication operation using the security key; and set the first namespace as the hidden namespace based on the host being authenticated by the authentication operation.

13. The storage system of claim 11, wherein the storage device is configured to:

receive, from the host, authorization information indicating access authorization of the first namespace to be assigned to the host during the first time period; and based on the entry signal and the authorization information, permit the host to access the first namespace.

14. The storage system of claim 11, wherein the storage device is further configured to:

receive, from the host, an ending signal indicating that the storage system is out of the first mode; and reset, based on the ending signal, the first namespace as the hidden namespace.

15. The storage system of claim 11, wherein the first time period comprises a period during which the storage system operates in a recovery mode.

16. The storage system of claim 11, wherein the first time period comprises a period during which the storage system operates in an update mode.

17. A storage device, comprising:

a plurality of non-volatile memories comprising a plurality of namespaces to have shared access among a plurality of users, the plurality of namespaces comprising a first namespace; and a storage controller configured to:

receive, from a host, a first command requesting to control exposure of the first namespace from among the plurality of namespaces to be hidden from at least one user among the plurality of users, the first command comprising an identifier of the first namespace;

set, based on the first command, the first namespace as a hidden namespace;

receive, from the at least one user, a second command instructing to output a first namespace list when the storage device is in a first mode;

output, based on the second command, a first list including one or more namespaces from among the plurality of namespaces that are allocated to the at least one user and that includes the first namespace;

receive, from the at least one user, a third command instructing to output a second namespace list when the storage device is out of the first mode; and output, based on the third command, a second list including the one or more namespaces from among the plurality of namespaces that are allocated to the at least one user and that excludes the first namespace.

18. The storage device of claim 1, wherein the first mode is an update mode.

19. The storage device of claim 1, wherein the first time period is a predetermined period after the storage device has entered the first mode.

20. The storage system of claim 13, wherein the access authorization comprises a read-only authorization.

\* \* \* \* \*